Patented Feb. 20, 1923.

1,446,314

UNITED STATES PATENT OFFICE.

JOHN FLICKINGER MYERS, OF CANON CITY, COLORADO, ASSIGNOR TO THE NEW JERSEY ZINC COMPANY, OF NEW YORK, N. Y., A CORPORATION OF NEW JERSEY.

CONCENTRATION OF MINERALS.

No Drawing. Application filed February 16, 1920, Serial No. 358,897. Renewed November 29, 1922.

*To all whom it may concern:*

Be it known that I, JOHN F. MYERS, a citizen of the United States, residing at Canon City, in the county of Fremont, State of Colorado, have invented certain new and useful Improvements in the Concentration of Minerals; and I do hereby declare the following to be a full, clear, and exact description of the invention, such as will enable others skilled in the art to which it appertains to make and use the same.

This invention relates to the concentration of ores by flotation.

The beneficial action of copper sulfate in promoting flotation in certain ore pulps has heretofore been observed. Indeed, with many ore pulps, it has been found necessary to use copper sulfate in order to secure satisfactory results by oil flotation. However, while with some ores the introduction into the ore pulp of copper sulfate in small quantities has proved singularly effective, it is also well known that with other ores the introduction of copper sulfate is either not beneficial or actually deleterious.

I have discovered that the use of copper sulfate or other appropriate soluble copper salts under conditions permitting the formation of flocculent gelatinous precipitates of copper, such as the hydroxides, the basic hydroxide, the carbonates or basic carbonate, has a remarkably beneficial effect in promoting the flotation of certain minerals. In the case of certain ores which are not amenable to flotation treatment by the ordinary practices, I have found that the use of copper sulfate under the conditions specified enables these ores to be satisfactorily and effectively concentrated by flotation.

When a solution of copper sulfate is treated with an appropriate quantity of a solution of a hydroxide or carbonate of ammonia or of the fixed alkali metals or of the metals of the alkaline earths, a flocculent gelatinous precipitate or hydrogel of copper hydroxide, basic copper hydroxide, copper carbonate, basic copper carbonate or like salt or mixtures of the same is formed. I have found when such a precipitate is formed in the ore pulp, or when it is separately produced and added to an ore pulp with sufficient agitation thoroughly to mix the precipitate with the pulp, that a pronounced improvement in the flotation results is secured. In general, I have found that improved flotation results are attained by the presence in the ore pulp of any flocculent gelatinous precipitate or hydrogel of copper, such, for example, as copper hydroxide, basic copper hydroxide, copper carbonate, basic copper carbonate, and the like. The copper hydrogel may be formed in the ore pulp itself, or may be especially prepared and introduced into the ore pulp. When formed in the ore pulp itself, copper sulfate may be added to the ore pulp together with an appropriate agent for reacting therewith to effect the formation of copper hydrogel.

It is well known that ammonium hydroxide and carbonate give precipitates with copper salts which are soluble if an excess of the ammonium salt is added, and that with the fixed alkali hydroxides or carbonates that the precipitates are of variable composition depending upon the relative concentration of copper salt and of fixed alkaline metal salt. While in general various soluble salts of copper and various precipitating agents could be used, I prefer copper sulfate and calcium hydroxide or lime water as the agents for producing the desired copper hydrogel, regardless of whether the reaction is effected in the pulp or whether it is separately effected and the resulting precipitate added to the pulp.

I have found that consistently improved flotation results may be secured by treating the ore pulp with the precipitate resulting from the interaction of a solution of copper sulfate and lime water. That the improved results are due to the presence of the copper hydrogel in the ore pulp and cannot be secured by a solution of copper sulfate or calcium hydroxide alone will be evident from the following tests which were conducted with "Hanover dust." This dust comes from the Hanover mill in a dry condition and is of such fineness as to be suitable for flotation feed without further comminution. This dust contains naturally large quantities of colloidal matter. Soluble salts are also present in the ore which start dissolving as soon as the ore is mixed with water. The chemical analysis of the ore is as follows:

| | |
|---|---|
| Zinc | 18.8% |
| Lead | Trace |
| Iron | 9.1% |
| Copper | Trace |
| Insoluble | 38.0% |
| Lime (CaO) | 10.9% |
| Sulfur | 10.7% |

In the following tests the charge of ore consisted of 800 grams of dry Hanover dust. Pine oil in the proportion of 0.7 pounds per ton of ore and heavy mineral fuel oil in the proportion of 2.1 pounds per ton of ore were used in combination as the frothing agent. The copper sulfate salt was first dissolved in water and used in the proportion of 1.25 pounds of copper sulfate ($CuSO_4$) per ton of ore. The flotation operations were carried out in a pneumatic flotation cell of the Callow type.

*Test No. 1.*

The charge consisted of ore, water and pine and mineral oils.

| | Zn analysis. | Zn recovery. |
|---|---|---|
| Rough concentrate | 21.6 | 32.0 |
| Tail | 18.3 | 68.0 |
| | | 100.0 |

These results indicate practically no separation, and prove that just oils alone cannot directly cause a separation on this ore.

*Test No. 2.*

The charge consisted of ore, water, copper sulfate and pine and mineral oils.

| | Zn analysis. | Zn recovery. |
|---|---|---|
| Rough concentrate | 21.5 | 27.4 |
| Tail | 19.0 | 72.6 |
| | | 100.0 |

These results show that the addition of copper sulfate does not enhance the separation. Numerous other tests were performed using various amounts of copper sulfate and modes of operation, but with no better success.

*Test No. 3.*

The charge consisted of ore, water, unslacked lime in the proportion of 5 pounds of lime per ton of ore and pine and mineral oils.

| | Zn analysis. | Zn recovery. |
|---|---|---|
| Rough concentrate | 39.1 | 56.39 |
| Tailings | 11.5 | 43.61 |
| | | 100.00 |

*Test No. 4.*

The charge was made up of a mixture of ore, water and copper sulfate to which was added unslacked lime in the proportion of 5 pounds of lime per ton of ore, and pine and mineral oils.

| | Zn analysis. | Zn recovery. |
|---|---|---|
| Rough concentrate | 41.4 | 90.9 |
| Tail | 2.9 | 9.1 |
| | | 100.0 |

*Test No. 5.*

The charge consisted of ore, water, pine and mineral oils to which was added calcium hydroxide and copper sulfate.

| | Zn analysis. | Zn recovery. |
|---|---|---|
| Rough concentrate | 45.6 | 84.56 |
| Tailing | 4.8 | 15.44 |
| | | 100.00 |

In this test the lime was placed in a beaker with 100 c. c. of distilled water and stood about two hours before used.

We note from the above test that a good float was obtained.

*Test No. 6.*

Two grams of lime were placed in a beaker with about 100 c. c. of distilled water. After standing for about two hours, the 2 c. c. of copper sulphate solution were added to the beaker and there instantly formed the usual bluish precipitate. After the precipitate had settled, a few drops of the clear solution was decanted into a test tube and tested with copper sulphate to prove that there remained an excess of lime.

A charge of Hanover dust was then treated with oils after which the contents of the beaker were added and thoroughly mixed therewith.

| | Zn analysis. | Zn recovery. |
|---|---|---|
| Rough concentrate | 41.0 | 80.01 |
| Tailing | 6.0 | 19.99 |
| | | 100.00 |

It will be noted that an excellent float was obtained. No free copper sulfate remained in the ore pulp by this procedure, and the float was effected by the copper precipitate and lime.

*Test No. 7.*

Two grams of lime (CaO) were placed in a beaker with distilled water and after standing for some time to dissolve the lime, the water was filtered off. Two c. c. of a 4 to 1 solution of copper sulfate was then added to the filtrate. The resulting precipitate was washed by decantation until substantially free from any uncombined lime or copper sulfate. The washed precipitate, together with two grams of lime, were added to a charge of ore and water and thoroughly mixed, and the usual oils were then added to the mixture.

|  | Zn analysis. | Zn recovery. |
|---|---|---|
| Rough concentrate | 42.5 | 83.4 |
| Tailing | 5.2 | 16.6 |
|  |  | 100.0 |

Tests Nos. 5, 6 and 7 demonstrate that the function of the copper sulfate in promoting the flotation of minerals is to form a precipitate. While this precipitate, which I have termed a hydrogel of copper, may alone serve to promote the flotation of minerals, I have found that its action is more beneficial in a slightly alkaline ore pulp, such, for example, as is provided by a slight excess of lime. Where copper sulfate is thus added to an ore pulp together with lime, the function of the lime is to react with the copper sulfate to form the copper hydrogel and in addition performs a definite function of its own by providing an excess of a hydroxid in the ore pulp.

I have determined that it makes no difference at what stage in the operation, or in what sequence, the lime, copper sulfate and oils are added to the ore pulp. Thus, these agents may be independently added to the ore pulp in any sequence, or may be added together. Moreover, dry lime may be added to the charge rather than a solution of calcium hydroxid or slacked lime.

In the foregoing tests, the action of lime is to be regarded as representative of any alkali or alkali-earth hydroxid and more generally as representative of any agent which will react with a solution of copper sulfate to form a copper hydrogel. Thus, for example, alkali or alkali-earth carbonates may be used in combination with copper sulfate in carrying out the invention.

The formation of the copper hydrogel must be accomplished in a slightly alkaline pulp, or the hydrogel, if separately produced, must be added to a pulp in which a slight alkalinity is maintained, in order to secure the desired results, and this alkalinity must be preserved within such limits as to prevent the resolution or decomposition of the copper hydrogel.

I am not prepared to state positively what is the action of the copper hydrogel in promoting flotation of minerals. It may be that the flocculent gelatinous copper precipitate has a dragnetting action upon the colloidal matters in the ore pulp, thereby preventing the detrimental action or prejudicial effect of such colloidal matters upon the valuable minerals contained in the pulp. Or it may be that there is some adsorption between the colloidal matters and the copper hydrogel by which the deleterious effect of these colloidal matters is overcome. In any event, it seems probable that the improved result is brought about by some interaction between the colloidal matters present in the ore pulp and the copper hydrogel as a result of which the presence of these colloidal matters no longer becomes prejudicial to flotation.

In the case of an ore pulp containing a relatively large amount of colloidal matter, I have found it advantageous to subject the pulp to a preliminary treatment for removing a part of the colloidal constituents. Thus, the colloidal constituents in the ore pulp may be dispersed or deflocculated and removed by decantation, and after the removal in this manner of an appropriate amount of colloidal constituents, the injurious effect of the remaining colloidal matter in the ore pulp may be overcome by treating the pulp with a copper hydrogel as hereinbefore explained. Where the colloidal matter in the original ore pulp is dispersed with sodium silicate, there will usually remain in the pulp a sufficient amount of free alkali, after the decanting operation, to react with the copper sulfate solution to produce the desired flocculent gelatinous precipitate of copper.

I claim:

1. The method of improving the flotation of minerals, which comprises treating the mineral pulp with a hydrogel of copper, and thereafter subjecting the pulp to a flotation operation.

2. The method of improving the flotation of minerals associated in a mineral pulp with colloidal constituents, which comprises subjecting the mineral pulp to the action of a hydrogel for inhibiting the prejudicial effect of said colloidal constituents upon the flotation of mineral particles, and thereafter subjecting the pulp to a flotation operation.

3. The method of improving the flotation of minerals associated in a mineral pulp with colloidal constituents, which comprises removing a part of the colloidal constituents from the mineral pulp, subjecting the mineral pulp to the action of a hydrogel of copper for inhibiting the prejudicial effect of said colloidal constituents upon the flotation of mineral particles, and thereafter subjecting the pulp to a flotation operation.

4. The method of improving the flotation of minerals associated in a mineral pulp with colloidal constituents, which comprises adding to the mineral pulp a dispersing agent for bringing about the dispersion of the colloidal constituents, removing a part of the dispersed colloidal constituents from the mineral pulp, subjecting the mineral pulp to the action of a hydrogel for inhibiting the prejudicial effect of said colloidal constituents upon the flotation of mineral particles, and thereafter subjecting the pulp to a flotation operation.

5. The method of improving the flotation of minerals associated in a mineral pulp with colloidal constituents, which comprises removing a part of the colloidal constituents in a dispersed condition from the mineral pulp, treating the mineral pulp with a hydrogel of copper, and thereafter subjecting the pulp to a flotation operation.

6. The method of improving the flotation of minerals which comprises subjecting the mineral pulp to the action of a hydrogel resulting from the interaction of a soluble copper salt and lime, and thereafter subjecting the pulp to a flotation operation.

7. The method of improving the flotation of minerals associated in a mineral pulp with colloidal constituents, which comprises subjecting the mineral pulp to the action of the precipitate resulting from the interaction of a copper solution and an alkaline hydroxid and thereby inhibiting the prejudicial effect of said colloidal constituents upon the flotation of mineral particles, and thereafter subjecting the pulp to a flotation operation.

8. The method of improving the flotation of minerals which comprises subjecting the mineral pulp to the action of a solution of copper and an excess of lime to react with the copper, and thereafter subjecting the pulp to a flotation operation.

9. The method of improving the flotation of minerals, which comprises subjecting the mineral pulp to the action of a copper precipitate resulting from the interaction of a soluble copper salt and an alkaline hydroxid, and thereafter subjecting the pulp to a flotation operation.

10. The method of improving the flotation of zinc sulphide associated in a mineral pulp with colloidal constituents, which comprises removing a part of the colloidal constituents from the mineral pulp, subjecting the mineral pulp to the action of a hydrogel of copper for promoting the flotation of zinc sulphide, and thereafter subjecting the pulp to a flotation operation.

11. The method of improving the flotation of zinc sulphide in a mineral pulp, which comprises treating the mineral pulp with a hydrogel of copper, and thereafter subjecting the pulp to a flotation operation.

12. The method of improving the flotation of zinc sulphide associated in a mineral pulp with colloidal constituents, which comprises removing a part of the colloidal constituents in a dispersed condition from the mineral pulp, treating the mineral pulp with a hydrogel of copper, and thereafter subjecting the pulp to a flotation operation.

13. The method of improving the flotation of zinc sulphide associated in a mineral pulp with colloidal constituents, which comprises adding to the mineral pulp a dispersing agent for bringing about the dispersion of the colloidal constituents, removing a part of the dispersed colloidal constituents from the mineral pulp, subjecting the mineral pulp to the action of a hydrogel of copper, and thereafter subjecting the pulp to a flotation operation.

In testimony whereof I affix my signature.

JOHN FLICKINGER MYERS.